Dec. 17, 1935.  M. G. KLEMME  2,024,693

GAS BURNER

Filed Feb. 16, 1934

INVENTOR:
Maurice G. Klemme,
by Carr, Stair & Gravely,
HIS ATTORNEYS.

Patented Dec. 17, 1935

2,024,693

UNITED STATES PATENT OFFICE 2,024,693

GAS BURNER

Maurice G. Klemme, Belleville, Ill., assignor to Eagle Foundry Company, Belleville, Ill., a corporation of Illinois Application February 16, 1934, Serial No. 711,484

2 Claims. (Cl. 158—116)

This invention relates principally to burners for gas ranges. It has for its principal objects to provide a simple, economical and compact gas burner which will secure a more efficient distribution of the heat, which can be quickly and easily assembled and disassembled, which will prevent clogging of the flame openings and which will secure a more thorough mixture of the air and gas and a smooth flow of such mixture through said burner. The invention consists in the gas burner and in the construction, combination and arrangement of parts hereinafter described and claimed.

Figure 1:
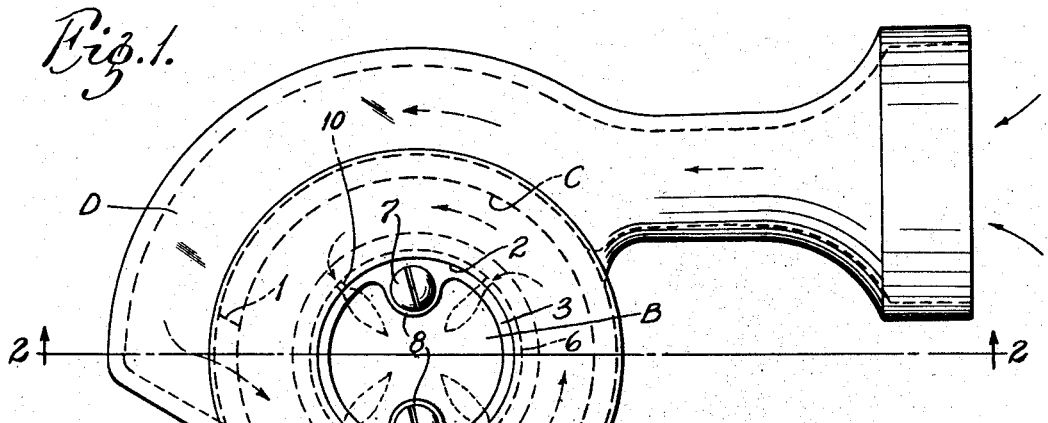
Figure 2:
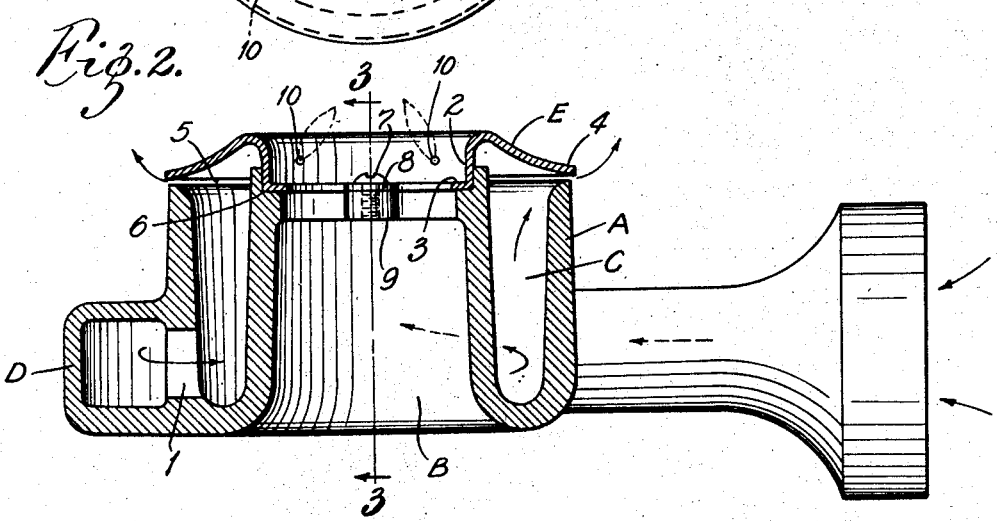
Figure 3:
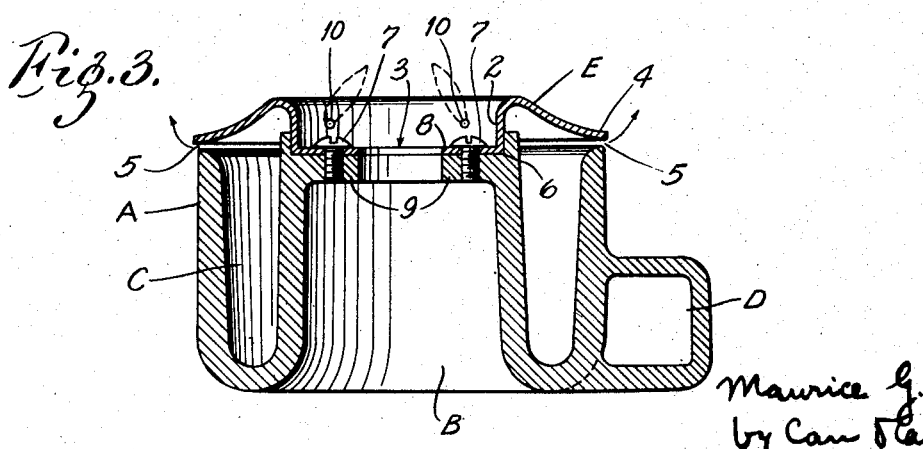

In the accompanying drawing, which forms part of this specification and wherein like symbols refer to like parts wherever they occur, Fig. 1 is a plan view of a gas burner embodying my invention, Fig. 2 is a vertical cross-section on the line 2—2 in Fig. 1; and Fig. 3 is a vertical cross-section on the line 3—3 in Fig. 2.

Referring to the accompanying drawing, a gas burner of the type used with gas ranges for heating utensils thereon comprises an annular burner head A having a central cylindrical opening B extending vertically therethrough, an annular mixing trough C surrounding said opening, and a horizontally disposed mixing tube D extending around one side of said burner head to the rear thereof where it communicates with said annular trough through a port 1. The forward or inlet end of the mixing tube is supplied with a proportionally regulated quantity of gas and air by means of the usual valve controlled gas and air inlet devices (not shown).

Mounted on the burner head A above the annular mixing trough C therein is an annular flame spreader or deflector plate E comprising an upstanding tubular portion 2, provided at its bottom with an inwardly extending base flange 3 and at its top with a flange 4 that slopes downwardly and outwardly over said mixing trough with its outer margin overhanging the peripheral edge of said burner head and spaced thereabove to form an annular flame outlet opening 5. The wall, which separates the central passageway of the burner head from the annular mixing trough, extends above the outer wall of said trough and is provided with a shouldered portion forming an annular seat 6 for the base flange 3 of the flame spreader. The flame spreader E is removably secured in the seat 6 provided therefor in the burner head A by means of screws 7 that extend downwardly through diametrically opposed pairs of cooperating lugs 8 and 9 provided therefor on said spreader and the burner, respectively. The tubular portion 2 of the flame spreader E is provided above the upper edge of the inner wall of the mixing trough C with a series of circumferentially spaced inwardly and upwardly inclined flame outlet openings 10.

In the operation of the burner, a regulated quantity of gas and air enters the outer or inlet end of the mixing tube D and is mixed together in passing therethrough. This mixture of air and gas thence passes through the port 1 into the annular mixing trough C at a substantial tangent thereto and rises therein in a swirling motion and escapes therefrom through the annular flame opening 5 at the periphery of the burner head A and through the circumferentially spaced flame openings 10 in the tubular portion 2 of the flame spreader or deflector E. The natural circulation of air around the outer edge of the burner head provides an adequate supply of secondary air to the flame issuing from the annular outlet opening 5. The proper amount of secondary air is supplied to the flame jets issuing from the inner outlet openings 10 through the central opening B in the burner head.

With this arrangement, the annular main burner flame is spread outwardly at the outer edge of the burner head and the series of converging flame jets from the openings 10 form a supplemental burner flame inside of said annular main burner flame for heating the middle portion of the cooking utensil. The flame spreader E may be quickly and easily attached to and removed from the burner head to facilitate cleaning thereof; and the seat for said spreader spaces the outer margin thereof the proper distance above the burner head. The flame spreader is inclined downwardly and outwardly and extends slightly beyond the outer edge of the burner head, thus forming a drip edge which prevents liquid spilled upon the spreader from entering the annular flame opening and clogging the same.

Obviously, the hereinbefore described gas burner admits of considerable modification without departing from the invention. Therefore, I do not wish to be limited to the precise construction shown and described.

What I claim is:

1. A gas burner comprising a burner head provided with a central opening and an annular mixing trough surrounding said opening, a mixing tube communicating with said trough at the rear of the burner head, and a flame spreader comprising a tubular portion disposed concentric with the central opening in said burner head and having an outwardly and downwardly sloping flange covering said trough, the outer edge of said flange being spaced above and projecting slightly beyond said burner head, said tubular portion being provided above said trough with a series of circumferentially spaced inwardly and upwardly inclined openings leading from the space beneath said spreader.

2. A gas burner comprising a burner head provided with a central opening and an annular mixing trough surrounding said opening, said opening being provided at its upper end with an annular seat, a mixing tube communicating with said annular trough, and a flame spreader comprising a tubular portion having a flange at its lower end supported on and removably secured to said annular seat, said tubular portion having a flange at its upper end that slopes downwardly and outwardly over said trough with its outer edge spaced above and projecting slightly beyond said burner head, said tubular portion being provided with a series of circumferentially spaced openings communicating with the space beneath the top flange thereof.

MAURICE G. KLEMME.